United States Patent [19]

Hattori et al.

[11] 4,451,112

[45] May 29, 1984

[54] METHOD AND APPARATUS FOR CONTROLLING AC MOTOR

[75] Inventors: Motonobu Hattori; Yasuharu Tamuro, both of Narashino; Akira Ishibashi; Kenji Nandoh, both of Funabashi, all of Japan

[73] Assignee: Hitachi, Ltd., Tokyo, Japan

[21] Appl. No.: 342,649

[22] Filed: Jan. 25, 1982

[30] Foreign Application Priority Data

Jan. 30, 1981 [JP] Japan .................. 56-11681

[51] Int. Cl.³ .................. H02P 1/26; H02P 1/28; H02P 1/30
[52] U.S. Cl. .................. 318/778; 318/798; 318/806
[58] Field of Search .......... 318/778, 798, 805, 806, 318/807–811

[56] References Cited

U.S. PATENT DOCUMENTS

| | | | |
|---|---|---|---|
| 3,819,992 | 6/1974 | Opaz et al. | 318/798 |
| 4,047,083 | 9/1977 | Plunkett | 318/807 |
| 4,259,845 | 4/1981 | Norbeck | 318/806 |
| 4,311,951 | 1/1982 | Walker et al. | 318/778 |

*Primary Examiner*—David Smith, Jr.
*Attorney, Agent, or Firm*—Antonelli, Terry & Wands

[57] ABSTRACT

A method and apparatus for controlling an induction motor, in which an AC power source is connected to the induction motor through a switch and a frequency converter, and the motor speed is controlled by controlling the output frequency and output voltage of the frequency converter. In the starting operation, the induction motor in a free-running state is supplied with an initial voltage in a given frequency which is expected to make the absolute value of the motor current minimum or near minimum, and then the supply voltage is increased gradually from the initial voltage with its frequency being retained at the given voltage. When the output frequency of the frequency converter reaches a predetermined value, the output frequency and voltage thereof are increased gradually with the ratio therebetween being maintained at a given value.

12 Claims, 11 Drawing Figures

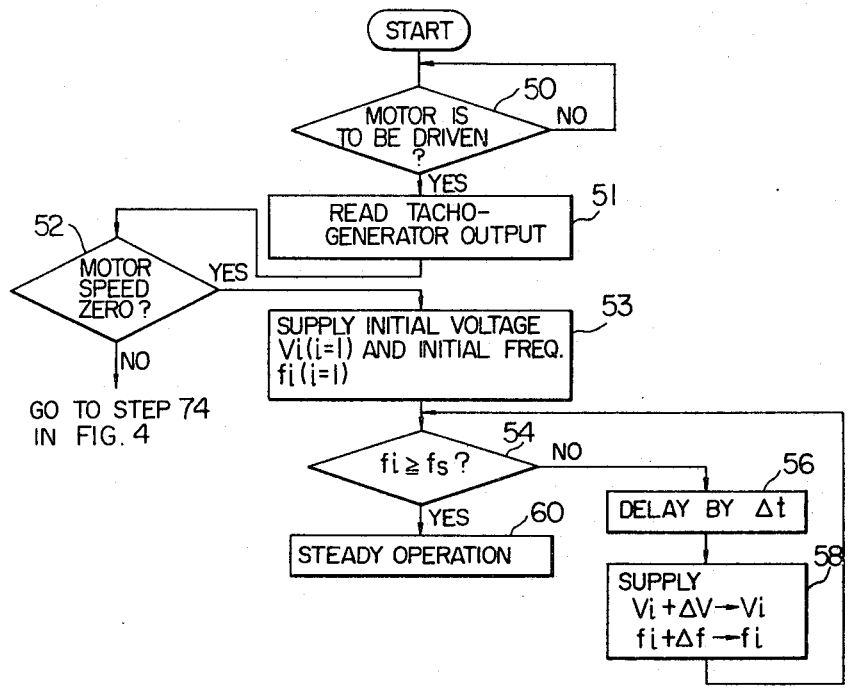
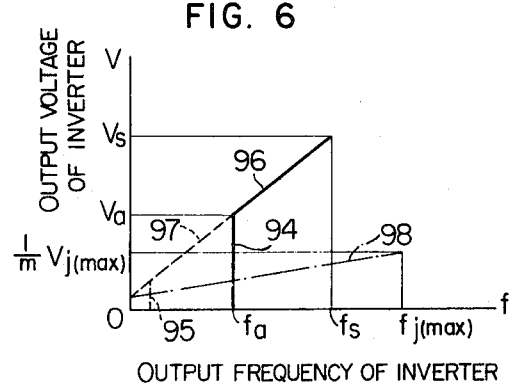

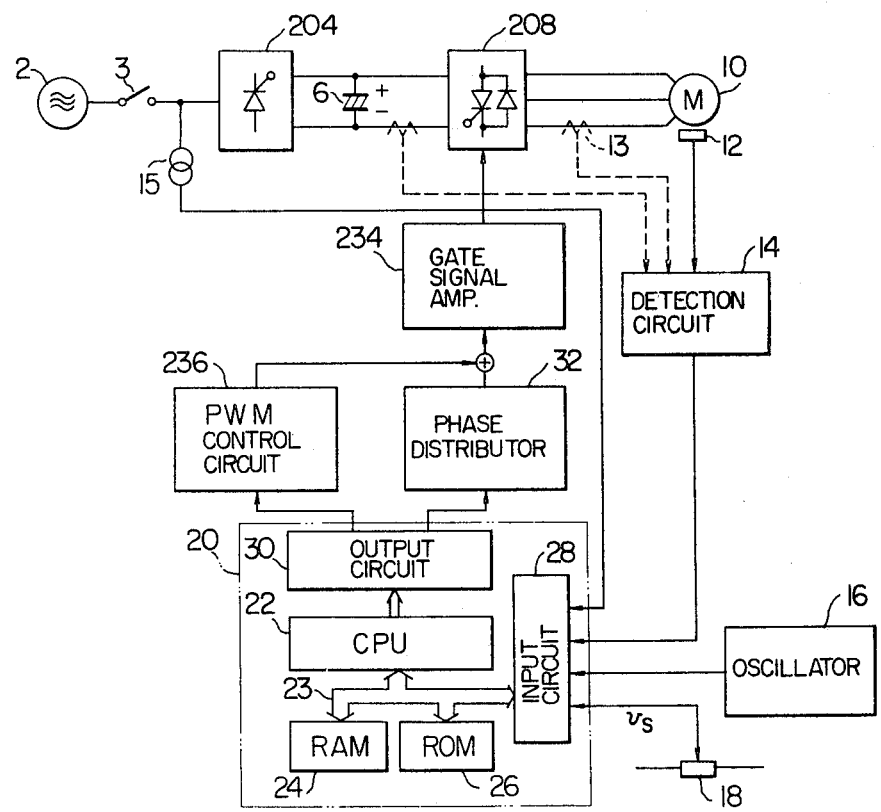

METHOD AND APPARATUS FOR CONTROLLING AC MOTOR

The present invention relates to a method and apparatus for controlling an AC motor which is driven through a frequency converter such as a cycloconverter and inverter.

There is known an apparatus for controlling an AC motor wherein the AC motor is connected to the AC power source through a frequency converter consisting of a power rectifier (hereafter referred to as rectifier) and a power inverter (hereafter referred to as inverter), and the AC motor is controlled by the frequency converter. In such a control apparatus, when a power failure occurs during the operation of the AC motor through the frequency converter, leaving the AC motor to rotate by inertia, and then if the power supply recovers while the AC motor is free-running, it is often observed that an immediate application of the power voltage to the AC motor in the same frequency and at the same level as those which have been supplied from the frequency converter to the AC motor before the power failure occurs cause a large motor current even if the duration of the power suspension is short. This phenomenon occurs based on the relation between the direction of the induced voltage in the AC motor and the phase of the power voltage when it is applied to the motor, and a large motor current results when the phase of the current caused by the induced voltage coincides with the phase of the current supplied from the power source.

It is also observed when the power supply has recovered that the larger the difference between the output frequency of the frequency converter and the motor speed when the converter has been restarted, the larger the motor current which results. Therefore, the frequency converter needs to have an increased power capacity, which is not economically desirable.

Accordingly, if a power failure lasts a relatively long time and the AC motor has slowed down to a low speed, an immediate application of the power voltage to the AC motor in the same frequency and at the same level as those before the power failure has occurred will cause a large difference between the output frequency of the frequency converter and the motor speed, resulting in a large motor starting current. This situation is also true in the case where a power failure occurs so that the motor is deactivated into a free-running state, power is supplied again to the motor in the same frequency and at the same level as those before the power failure has occurred.

In order to avoid such a large motor starting current, the conventional method is to restart the AC motor after it has stopped regardless of the duration of the power failure or the duration of deactivation of the motor. Restarting of the AC motor is carried out by gradually increasing the frequency of the power voltage supplied to the motor, and therefore, it takes a long time to restart the motor and put it into the steady operating condition.

In order to overcome this deficiency, there has been proposed a method wherein the inverter is controlled to synchronize with the motor speed during a power failure and free running of the motor, and on recovery of the power supply the frequency converter is restarted with its output frequency synchronized with the motor speed, so that the motor in a falling-down speed is accelerated up to the normal operating speed. This method is disclosed, for example, in German Patent Laid-Open publication No. 2,520,164 published on Nov. 27, 1975. This method, however, needs the detection of the speed and phase of the AC motor during the power failure, i.e., during the deactivation of the motor, and thus it can be applied to synchronous motors but can not be applied to induction motors.

Accordingly, it is an object of the present invention to provide a method and apparatus for operating an induction motor by use of a frequency converter, wherein an induction motor running by inertia can he restarted in a short time with a small current for reenergizing the motor.

In order to achieve the above-mentioned object, the method of the present invention is characterized in that an initial voltage with a frequency which is assumed to minimize the absolute value of the motor current is applied to the free-running induction motor at restarting thereof, and subsequently the voltage and the frequency is increased gradually so that the induction motor is energized normally.

The above and other objects, features and advantages of the present invention will be more clear from the following description with reference to the accompanying drawings, in which:

FIG. 3 is a flowchart showing the normal operation of the control apparatus of FIG. 1;

FIG. 6 is a graph showing the relationship between the output voltage and frequency of the inverter;

FIG. 11 is a block diagram of the third embodiment of the present invention.

Figure 1:
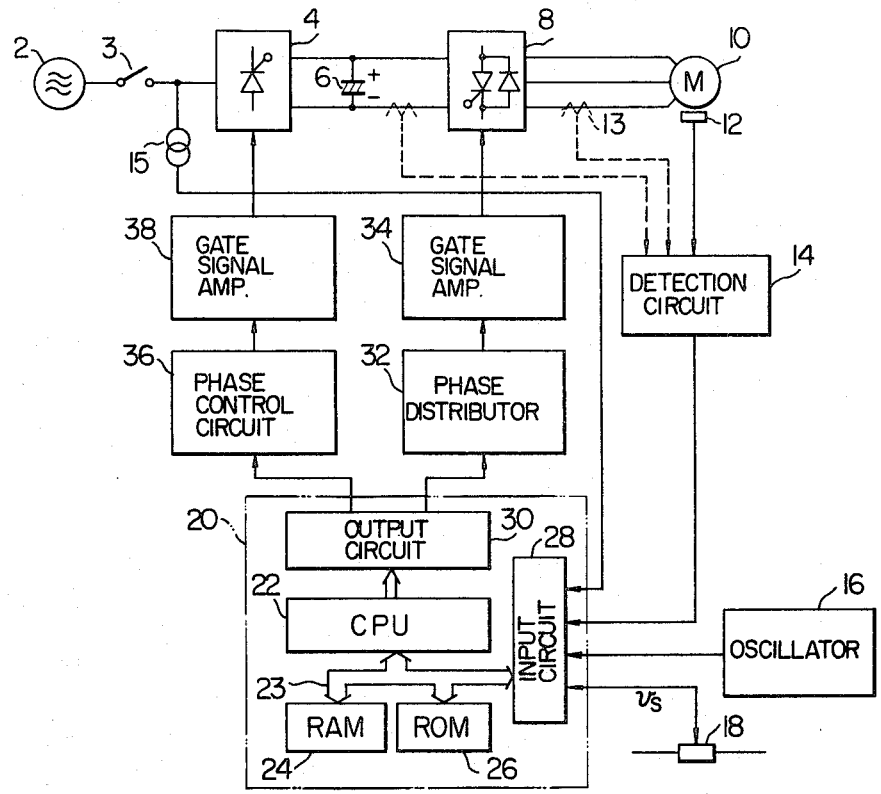
FIG. 1 is a block diagram of an embodiment of the induction motor control apparatus according to the present invention.

The induction motor control apparatus according to the present invention will now be described with reference to the accompanying drawings. FIG. 1 is a block diagram showing the first embodiment of the induction motor control apparatus according to this invention, where a frequency converter of a pulse amplitude modulation (PAM) system is used for driving an induction motor. In the figure, an AC power source 2 is connected through a switch 3 to a power rectifier 4 which converts the alternating current from the AC power source 2 into a direct current. The DC output from the rectifier 4 is smoothed by a smoothing capacitor 6 and supplied to a power inverter 8 which converts the direct current into an alternating current. Then, the AC output from the inverter 8 is supplied to an induction motor 10.

In the present invention, the circuit arrangement for controlling the frequency converter, i.e., made up of the rectifier and the inverter, employs a microcomputer 20. The microcomputer 20 comprises a central processing unit (CPU) 22, a random access memory (RAM) 24, a read only memory (ROM) 26, an input circuit 28, and an output circuit 30. The CPU, RAM, ROM, and input circuit are interconnected through data, address, and control buses 23.

The induction motor 10 is provided with a tachometer generator 12 which produces an analog voltage in proportion to the motor speed, and it is delivered to a detection circuit 14. The detection circuit 14 makes level conversion and filtering for the analog voltage output from the tachogenerator 12 thereby applying it to the input circuit 28. The tachometer generator 12 may be replaced by a pulse generator which produces pulses in synchronizm with the rotation of the motor 10. The output signal of the detection circuit 14 is converted into a parallel digital signal by the input circuit 28.

An oscillator 16 generates clock pulses with a constant frequency, and supplies them to the input circuit 28. A speed setup unit 18 provides an analog voltage which indicates a manual setup speed, and supplies it to the input circuit 28, in which the analog voltage is converted into a digital signal.

The CPU performs the predetermined computation in response to the signals received by the input circuit 28 and data stored in the RAM and also in accordance with the program stored in the ROM. The result of computation is delivered through the output circuit 30 to a phase control circuit 36 and a phase distributor 32.

The rectifier 4 is controlled through the phase control circuit 36 and a gate signal amplifier 38 so that it produces a target DC output voltage. The inverter 8 is controlled for its output frequency through the phase distributor 32 and a gate signal amplifier 34 so that the motor 10 is operated at a target speed set by the speed setup unit 18.

In order to detect a power failure of the AC power source 2 and also its recovery, the AC power voltage is conducted through a transformer 15 to the input circuit 28.

Figure 2:
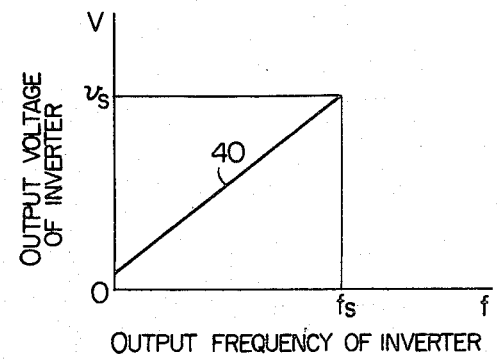
FIG. 2 is a graph showing the relation between the output voltage and the output frequency of the frequency converter for starting the induction motor.

The operation in the normal operating condition of the control apparatus arranged as described above will now be explained by use of the flowchart in FIG. 3. A common method of starting an induction motor is that the ratio of the motor supply voltage V to its frequency f is maintained substantially constant as shown in FIG. 2, and the voltage V and the frequency f are increased along a line 40. The control apparatus of this invention also employs this starting method.

The flowchart shown in FIG. 3 is put into operation in accordance with the program stored in the ROM 26. Initially in step 50, the CPU reads through the input circuit 28 the setup motor speed vs set on the speed setup unit 18. If the setup motor speed vs indicates zero, it is determined that the motor is not to be driven, and control returns to step 50. If the setup motor speed vs does not indicate zero, it is determined that the motor is to be driven, and the CPU computes the output voltage (setup command voltage) $V_s$ and its frequency (setup command frequency) $f_s$ of the inverter 8 for attaining the setup speed $v_s$, and stores them in the RAM 24.

Next in step 51, the CPU reads the output of the tachometer generator 12 through the input circuit, then in step 52 determines whether the motor speed is zero or not. If the motor speed is found zero, step 53 proceeds so as to carry out the ordinary zero-starting method. If the motor speed is not zero, it is determined that the motor is running by the inertia, and step 74 in FIG. 4 will proceed.

Next in step 53, the CPU calculates values of the voltage command signal and frequency command signal to be supplied to the phase control circuit 36 and the phase distributor 32 corresponding to the initial command voltage $V_{i(i=1)}$ and initial command frequency $f_{i(i=1)}$, respectively, to be supplied to the motor 10, then delivers them through the output circuit 30 to the phase control circuit 36 and phase distributor 32. Here, the frequency command signal is a pulse signal having a frequency corresponding to the output frequency of the inverter, and the voltage command signal is an analog signal having a level corresponding to the output voltage of the rectifier. The voltage command signal is amplified by the gate signal amplifier 38 and delivered to the rectifier 4. The conduction phase angle of thyristors in the rectifier 4 is controlled so that the output voltage thereof is equal to the initial command voltage $V_1$. The frequency command signal is amplified by the gate signal amplifier 34 and delivered to the inverter 8, in which the conduction angle of thyristors is controlled so that the output frequency is equal to the initial command frequency $f_1$.

Next in step 54, the CPU checks whether the command frequency $f_i$ is equal to or higher than the setup frequency $f_s$ stored in the RAM, and if $f_i$ is higher than or equal to $f_s$ control proceeds to step 60. If $f_i$ is lower than $f_s$, control proceeds to step 56. Initially, $f_i$ is lower than $f_s$, and control proceeds to step 56. Alternatively, this determination may be done based on whether the command voltage $V_i$ is higher than the setup voltage $V_s$. In step 56, clock pulses from the oscillator 16 are counted by the software counter in the RAM, and when the count has reached a predetermined value, i.e. on expiration of a predetermined period $\Delta t$, control proceeds to step 58. In step 58, the present command voltage $V_{i(i=1)}$ added by a predetermined voltage $\Delta V$ stored in the RAM becomes the new command voltage $V_{i(i=2)}$, and the present command frequency $f_i$ added by a predetermined frequency $\Delta f$ stored in the RAM becomes the new command frequency $f_{i(i=2)}$. Then, the voltage command signal corresponding to the command voltage $V_2$ and the frequency command signal corresponding to the command frequency $f_2$ are read out from the RAM, and these signals are given to the phase control circuit 36 and the phase distributor 32, respectively, in place of the previous voltage and frequency command signals, so that the output voltage from the rectifier is equal to $V_2$ and the output frequency of the inverter 8 is equal to $f_2$.

Next in step 54, the CPU checks whether the command frequency $f_i$ is equal to or higher than the setup frequency $f_s$ obtained in step 50, and carries out the steps 54 through 58 repetitively until $f_i$ becomes higher than or equal to $f_s$, thereby increasing the command voltage $V_i$ and command frequency $f_i$ along the line 40 in FIG. 2. In so doing, when the CPU detects in step 54 that $f_i$ becomes higher than or equal to $f_s$, control proceeds to step 60 so that the steady operation takes place with the command voltage and command frequency set to $V_s$ and $f_s$, respectively. Determination in step 54 may be done based on whether the command voltage $V_i$ is higher than the setup voltage $V_s$.

Figure 4:
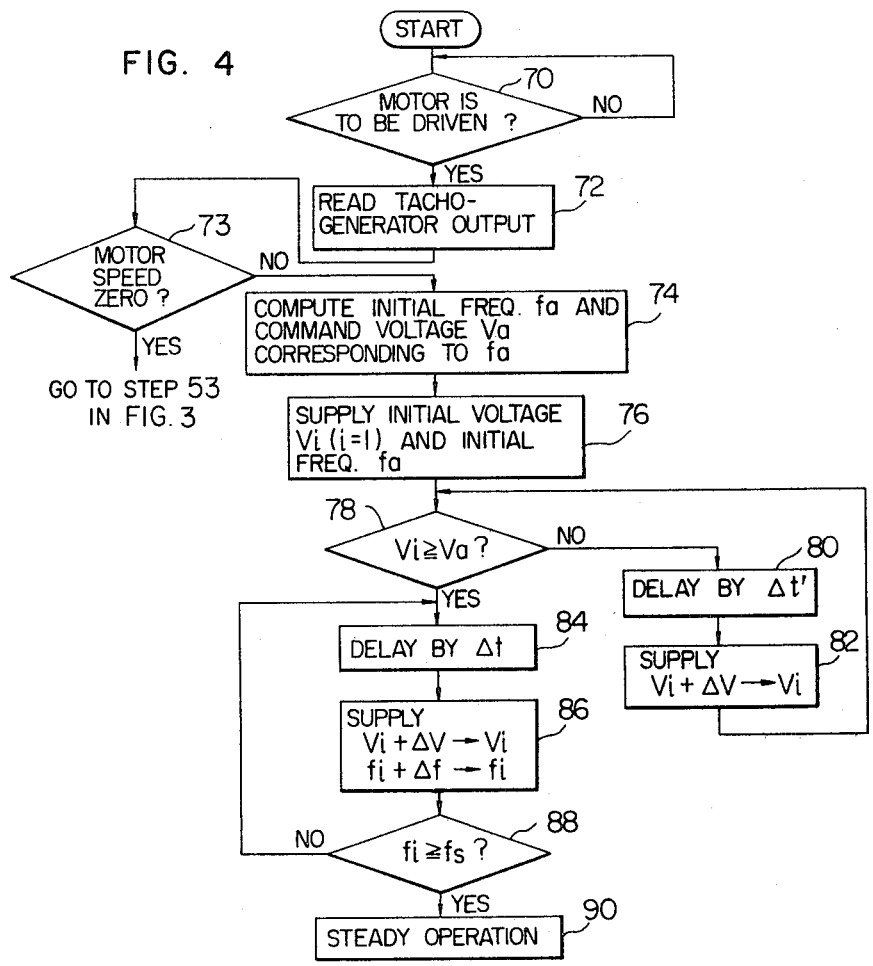
FIG. 4 is a flowchart showing the restarting operation of the motor.
Figure 5:
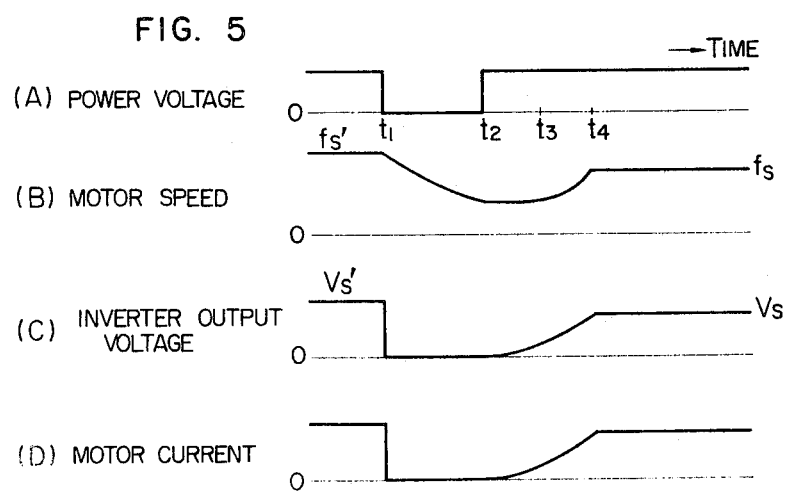
FIG. 5 is a timing chart explaining the operation of the flowchart in FIG. 4.

Next, the operation of restarting the motor in the case where the AC power source 2 has failed, leaving the motor to run by the inertia, and then the power supply recovers while the motor is free-running will be described with reference to the flowchart of FIG. 4 and the timing chart of FIG. 5. First, when the power source 2 fails at point a time $t_1$ as shown in FIG. 5 while the motor 10 is running in a steady condition, the output voltage of the inverter 8 and the motor current fall to their zero level, and the motor is put into a free-running state by the inertia. When the power supply recovers at point a time $t_2$ while the motor is free-running and a command for restarting the motor is issued, it is determined that the motor in a free-running state is to be restarted and step 70 of FIG. 4 is initiated according to the program stored in the ROM. The command for restarting the motor is issued on condition that the switch 3 is closed and the speed setup unit 18 is set to somewhere other than zero. That is, the CPU determines the restarting of the free-running motor on receiving through the input circuit 28 a power recovery signal from the transformer 15, a motor rotation signal from the tachometer generator 12 through the detection circuit 14, and a restarting command signal from the speed setup unit 18.

First in step 70, the CPU reads the outputs of the transformer 15 and speed setup unit 18 through the input circuit 28. If the output of the transformer 15 is zero or if the speed setup unit indicates zero speed, it is determined that the motor is not to be driven, and control returns to step 70. If the output of the transformer is higher than a predetermined level and the setup speed is not zero, it is determined that the motor is to be driven and the setup command voltage $V_s$ and setup command frequency $f_s$ corresponding to the setup speed $v_s$ on the speed setup unit 18 are computed and stored in the RAM 24.

Next in step 72, the CPU reads the output signal of the tachometer generator 12 through the detection circuit 14 and pulse input circuit 28 to estimate the rotational speed N of the induction motor 10. If the motor speed is found zero in step 73, it is determined that the motor is restarted from zero speed and control proceeds to step 53. If the motor speed is not zero, it is determined that the motor under free run is restarted and control proceeds to step 74. The steps 70, 72 and 73 may be made identically to steps 50, 51 and 52, respectively, in FIG. 3.

In step 74, the CPU computes the output command frequency $f_a$ of the inverter 8 which would achieve the motor speed of N as obtained in step 72 in consideration of the slip of the induction motor. The CPU also obtains the output command voltage $V_a$ of the rectifier 4 corresponding to the command frequency $f_a$ based on the line 40 on the graph of FIG. 2, and stores it in the RAM.

In step 76, the CPU reads the RAM for the voltage command signal corresponding to the initial command voltage $V_{i(i=1)}$ ($V_i << V_a$) to be applied to the motor, then delivers the signal through the output circuit 30 to the phase control circuit 36. At the same time, the CPU reads the RAM for the frequency command signal corresponding to the command frequency $f_a$, and delivers the signal to the phase distributor 32. Thus, the motor is supplied with a power at the command voltage $V_1$ and in the command frequency $f_a$ from the inverter 8.

In step 78, the CPU checks whether the present command voltage $V_i$ is equal to or higher than the command voltage $V_a$, and if $V_i \geq V_a$, control proceeds to step 84.

If $V_i < V_a$, control proceeds to step 80. Here, the command voltage $V_{i(i=1)}$ is lower than $V_a$, and control proceeds to step 80.

In step 80, clock pulses from the oscillator 16 are counted in the RAM, and when the count reaches a predetermined value, i.e. on expiration of the predetermined period $\Delta t'$, control proceeds to step 82. Thus, step 80 causes a time delay of $\Delta t'$.

In step 82, the present command voltage $V_{i(i=1)}$ added by the predetermined voltage $\Delta V$ stored in the RAM becomes the new command voltage $V_{i(i=2)}$. The CPU reads the RAM for the voltage command signal corresponding to the command voltage $V_2$ and supplies it to the phase control circuit 36 in place of the previous voltage command signal, so that the output voltage of the rectifier is equal to $V_2$. The frequency command signal retains its value, and thus the output frequency of the inverter 8 is kept $f_a$.

Next in step 78, the CPU checks again if the command voltage $V_i$ is higher than $V_a$, and carries out the steps 78 through 82 repetitively until $V_i$ becomes higher than or equal to $V_a$, thereby increasing the command voltage $V_i$ along the line 94 in FIG. 6. This process corresponds to the period from the times $t_2$ to $t_3$ in FIG. 5, in which the inverter output voltage and the motor current increase gradually with the motor speed retained almost constant. That is, the inverter output frequency $f_a$ matches the motor speed, and there is no difference between the frequencies of the inverter output signal and the induced voltage in the induction motor when considering the slip. In addition, even if the phase difference between the inverter output signal and the induced voltage in the induction motor is large when the inverter is activated (at the time $t_2$), the inverter output voltage is small at the time $t_2$ and will increase gradually after that. Thus, the motor current makes a small transition at the time $t_2$, and a residual voltage of the motor becomes small as the inverter output voltage increases gradually. Accordingly, even if the inverter output voltage increases, the motor current does not become too large, but increases gradually as shown in (D) of FIG. 5.

When the CPU detects in step 78 that the command voltage $V_i$ has reached $V_a$, control proceeds to step 84 and the operation of the motor 10 along the line 94 in FIG. 6 is completed. This event occurs at the time $t_3$ in FIG. 5. Step 84 is accompanied by a time delay of the predetermined period $\Delta t$ as in the case of step 80.

Next in step 86, the present command voltage $V_{i(i=a)}$ added by the predetermined voltage $\Delta V$ stored in the RAM becomes the new command voltage $V_{i(i=a+1)}$ and the present command frequency $f_{i(i=a)}$ added by the predetermined frequency $\Delta f$ stored in the RAM becomes the new command frequency $f_{i(i=a+1)}$. The CPU reads the RAM for the voltage command signal corresponding to the command voltage $V_{a+1}$ and the frequency command signal corresponding to the command frequency $f_{a+1}$, and supplies these signals to the phase control circuit 36 and the phase distributor 32, respectively, in place of the previously applied voltage command signal and frequency command signal, so that the output voltage of the rectifier 4 becomes $V_{a+1}$ and the output frequency of the inverter 8 becomes $f_{a+1}$.

Next in step 88, the CPU checks whether the command frequency $f_i$ is equal to or higher than the setup frequency $f_s$ obtained in step 70, and carries out steps 84 through 88 repetitively until $f_i$ becomes higher than or equal to $f_s$, so that the command voltage $V_i$ and the command frequency $f_i$ increase, with ratio $V_i/f_i$ remaining constant, along the line 96 in FIG. 6. The line 96 has the same gradient as that of the line 40 in FIG. 2. In so doing, when the CPU detects in step 88 that $f_i$ becomes higher than or equal to $f_s$, control proceeds to step 90, and the steady operation takes place with the command voltage being of the setup voltage $V_s$ and the command frequency of the setup frequency $f_s$.

The process of steps 84 through 88 corresponds to the period from the time $t_3$ to $t_4$, and the motor speed increases as the command frequency $f_i$ increases shown in (B) of FIG. 5. The output voltage of the inverter 8 also increases as the command voltage $V_i$ increases as shown in (C) of FIG. 5. The motor current does not become too large, since the frequency of the inverter output signal matches the frequency of the induced voltage in the induction motor at the time $t_3$ and the motor is started by a reduction voltage start-up method shown by steps 76–82, and the current will increase gradually as the command voltage $V_i$ increases.

When control proceeds to step 90 at point the time $t_4$ for the steady operation, the motor speed, the inverter output voltage and the motor current reach their steady state as shown in FIG. 5.

As described above, when the free-running motor is reenergized, the inverter increases the output voltage thereof gradually with its frequency matching the motor speed, thereby preventing an excessive transient motor current and allowing the motor to restart in a short time. Time period required from restarting the motor to finishing reduction voltage start-up along the line 94 in FIG. 6 is preferably equal to or longer than the second time constant of the motor. The second time constant T of the motor is given by $T=(LM+LZ)/R_2$, where LM is an excitation inductance, LZ is a leakage inductance and $R_2$ is a second resistance of the motor. The second time constant is generally in a range from 0.2 to 1.0 second.

In the foregoing embodiment, in order to prevent an excessive motor current during the restarting of the motor which is running by the inertia, the motor speed is detected by the tachometer generator and the command frequency which matches the motor speed is provided.

The second embodiment of the present invention features that instead of detecting the motor speed by the tachometer generator, the motor current is measured while sweeping the inverter output frequency $f_i$, and the inverter output frequency $f_a$ which makes the motor current minimum is used to restart the motor. Consequently, the inverter output frequency $f_a$ shows the value which matches the motor speed.

Figure 7:
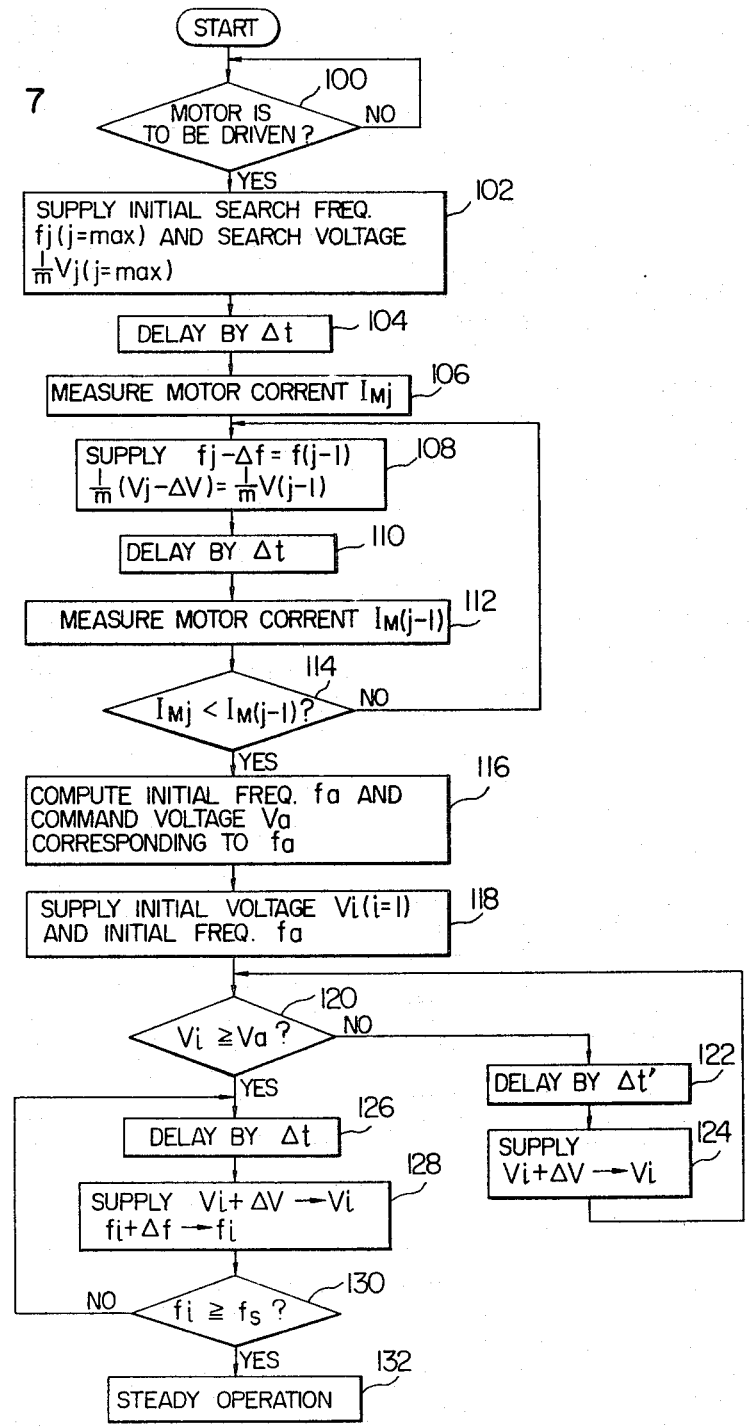
FIG. 7 is a flowchart showing the operation of the second embodiment of the present invention.
Figure 8:
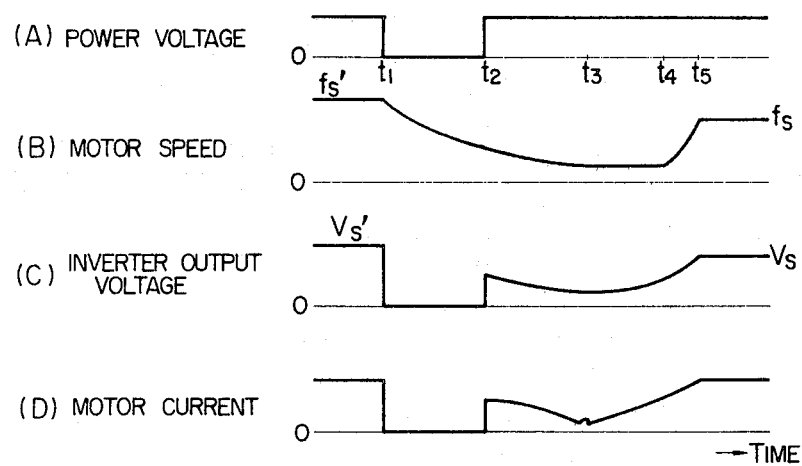
FIG. 8 is a timing chart explaining the operation of the flowchart in FIG. 7.

The following describes the second embodiment of the invention with reference to the block diagram of FIG. 1, the flowchart of FIG. 7 and the timing chart of FIG. 8. This embodiment also employs a PAM system in operating the frequency converter. In the circuit arrangement, the difference of this embodiment from the first embodiment resides in the program in the ROM and data in the RAM, and a provision of a current detector 13 for detecting the motor current at the output of the inverter 8 in place of the tachometer generator 12 in the first embodiment. The current detector 13 may be provided between the capacitor 6 and the inverter 8. An analog output signal from the current detector 13 undergoes the level conversion through the detection circuit 14, then delivered to the input circuit 28.

Figure 9:
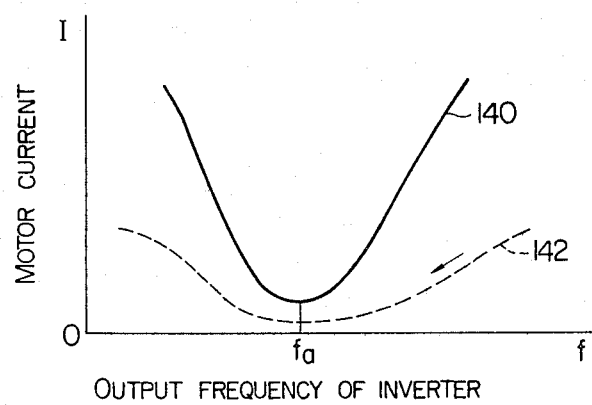
FIG. 9 is a graph showing the relation between the inverter frequency and the motor current used in the second embodiment.

The operation of the second embodiment will now be described with reference to the flowchart of FIG. 7. First in step 100, the CPU reads the outputs of the transformer 15 and speed setup unit 18. If the output of the speed setup unit is zero, it is determined that the motor is not to be driven, and control returns to step 100. If the output of the transformer is larger than a predetermined value and the setup speed is not zero, it is determined that the motor is to be driven, and the CPU reads the setup speed $v_s$ set on the speed setup unit 18 and calculates the setup command voltage $V_s$ and setup command frequency $f_s$ corresponding to the setup speed, and stores them in the RAM. Next, the CPU searches for the best inverter output frequency $f_a$ in steps 102 through 116 so as to prevent an excessive transient current in the motor. This frequency search is carried out by gradually reducing the inverter output frequency from an inverter output frequency $f_{i(i=max)}$ corresponding to the maximum motor speed along the line 98 in FIG. 6. In this case, the inverter output voltage may be as high as $1/m$ (e.g. $m=10$) of the output voltage supplied in the ordinary operation of the motor as shown by the line 96, because the motor is not required for providing an output drive torque. Accordingly, the line 98 has a gradient $1/m$ that of the line 96. When the inverter output frequency and output voltage are decreased along the line 98, the motor current varies in relation to the inverter output frequency as shown by the curve 142 in FIG. 9. The curve 140 indicates the variation of the motor current when the inverter output frequency and output voltage are varied along the line 96 of FIG. 6. As shown by the curve 142, the motor current is small when the inverter output frequency and output voltage are varied along the line 98 relative to that when varied along the line 96, thereby leaving no possibility of an excessive transient current in the motor. However, if the motor current is too small, it will be difficult to measure accurately the frequency $f_a$ which makes the motor current minimum as will be described shortly. Therefore, the value of m should be chosen so that the motor current has an appropriate value. When the inverter output frequency and output voltage are varied along the line 98 of FIG. 6, the motor current becomes minimum when the inverter output frequency matches the frequency of the induced voltage in the motor as shown on the curve 142 in FIG. 9. Accordingly, with the inverter output frequency at this point given to the motor as the initial command frequency $f_a$ for restarting, an excessive transient current in the motor can be prevented.

The above-mentioned frequency search operation will be described in detail with reference to the flowchart of FIG. 7. First in step 102, the inverter output frequency $f_j$ $_{(j=max)}$ corresponding to the maximum motor speed is used as the initial search frequency, and the CPU reads the RAM for the value of the frequency command signal corresponding to the initial search frequency $f_j$ $_{(j=max)}$ and delivers it through the output circuit to the phase distributor 32. The CPU also reads the RAM for the inverter output voltage $V_j$ $_{(j=max)}$ corresponding to the initial search frequency $f_j$ $_{(j=max)}$ in accordance with the line 40 in FIG. 2 or the line 96 in FIG. 6. A voltage $1/m$ that of the inverter output voltage, i.e. $1/m$ $V_j$ $_{(j=max)}$, is used as the initial search voltage, and the CPU reads the RAM for the voltage command signal corresponding to that voltage and delivers it through the output circuit to the phase control circuit 36. Then, the rectifier outputs a voltage of $1/m$ $V_j$ ($j=max$) and the inverter outputs a frequency of $f_{j(j=max)}$. The inverter output has not a sufficient power to drive the motor.

Next to step 104, clock pulses from the oscillator 16 are counted in the RAM, and when the count has reached the predetermined value, i.e. on expiration of the predetermined period $\Delta t$, control proceeds to step 106. In step 106, the CPU reads the output of the motor current detector 13 through the detection circuit 14 and input circuit 28 so that the motor current $I_{Mj(j=max)}$ corresponding to the search frequency $f_{j(j=max)}$ is detected.

In step 108, the present search frequency $f_{j(j=max)}$ subtracted by a predetermined frequency $\Delta f$ stored in the RAM, i.e. $f_{(j-1)}$ becomes the new search frequency, and the present search voltage $1/m\ V_{j(j=max)}$ subtracted by a predetermined voltage $1/m\ \Delta V$, i.e. $1/m\ (V_j-\Delta V)$, becomes the new search voltage. The CPU reads the RAM for the search frequency command signal and search voltage command signal corresponding to the new search frequency $f_{(j-1)}$ and search voltage $1/m\ V_{(j-1)}$, respectively, and delivers these signals through the output circuit 30 to the phase distributor 32 and phase control circuit 36, respectively, in place of the previously applied search frequency command signal and search voltage command signal. Step 110 is accompanied with a time delay of the predetermined period $\Delta t$ as in the case of step 104.

Next in step 112, a motor current $I_{M(j-1)}$ corresponding to the search frequency $f_{(j-1)}$ is detected.

In step 114, the CPU compares the motor current $I_{Mj}$ which has been measured previously and stored in the RAM with the present motor current $I_{M(j-1)}$ detected in step 112. If $I_{Mj}$ is smaller than $I_{M(j-1)}$, i.e., if the motor current has increased in response to a decrease of the search frequency, control proceeds to step 115. If $I_{Mj}$ is larger than $I_{M(j-1)}$, i.e. if the motor current has decreased in response to a decrease of the search frequency, control returns to step 108. Here, the motor current decreases as the search frequency decreases, and control returns to step 108. The steps through 114 are carried out repetitively so that the search frequency $f_j$ and search voltage $1/m\ V_j$ are decreased along the line 98 in FIG. 6, and the motor current $I_{Mj}$ which is detected each time will decrease gradually as shown by the curve 142 in FIG. 9. In so doing, when the search frequency reaches a predetermined value $f_{(j-1)(j=a)}$, for example, the motor current $I_{M(j-1)(j=a)}$ makes an increase when compared with the motor current $I_{Mj(j=a)}$ for the previously measured search frequency $f_{j(j=a)}$, (i.e. $fa=f_{(a-1)}+\Delta f$). Thus, the motor current turns to increase as the search frequency decreases, and the motor current $I_{Mj(j=a)}$ shows the minimum value on the curve 142 in FIG. 9. Accordingly, when $I_{Mj}$ is found smaller than $I_{M(j-1)}$ in step 114, control proceeds to step 116 to complete the frequency search operation. Consequently, the search frequency $f_a$ corresponding to the motor current $I_{Ma}$ matches the frequency of the induced voltage in the motor, and by using this frequency as the initial command frequency, the minimum motor current for restarting can be attained. Thus, during the process from the recovery of the power supply at the time $t_2$, to completion of the frequency search operation at the time $t_3$, the motor speed decreases gradually.

Next in step 116, the search frequency $f_a$ is used as the initial command frequency for restarting the motor, and the CPU obtains the output voltage $V_a$ of the rectifier 4 corresponding to the initial command frequency $f_a$ from the relationship of the line 40 in FIG. 2 and stores it in the RAM. In step 118, the CPU reads the RAM for the voltage command signal corresponding to the initial command voltage $V_{i(i=1)}$ to be supplied to the motor, and delivers it through the output circuit 30 to the phase control circuit 36. At the same time, the CPU reads the RAM for the frequency command signal corresponding to the command frequency $f_a$ and delivers it to the phase distributor 32. Thus, the motor is supplied with power at the command voltage $V_1$ and in the command frequency $f_a$ from the inverter 8.

The subsequent operation is identical to that of the first embodiment, with steps 120-132 corresponding to steps 78-90 in FIG. 4, and the explanation there of will be omitted. The command voltage with its frequency kept constant at $f_a$ is increased gradually along the line 94 in FIG. 6 until the voltage reaches $V_a$. This operation is shown in the period from times $t_3$ to $t_4$ in FIG. 8, in which the inverter output voltage and thus the motor current are increased gradually while the motor speed is maintained almost constant. In this case, the inverter output frequency, i.e. the command frequency $f_a$, matches the rotational speed of the motor, and the initial command voltage is low even if there exists a phase difference between the initial output voltage of the inverter and the induced voltage, resulting in a small transient current in starting the motor. In addition, the induced voltage decreases as the command voltage is increased gradually, thus preventing an excessive motor current even for a high command voltage. When the command voltage reaches $V_a$ at a time $t_4$, both the command frequency and command voltage are increased while maintaining their ratio at the predetermined value as defined by the line 96 in FIG. 6. Consequently, the motor speed increases gradually as shown in (B) of FIG. 8. When the command frequency reaches the setup frequency $f_s$ obtained in step 100 at a time $t_5$, control is transferred to the steady operation with the command frequency being of $f_s$ and the command voltage of $V_s$. This embodiment is of course applicable to a case wherein the motor in a stop condition is started. Namely, in this case, a command voltage is increased along a line 95 with a fixed frequency in steps 116 to 120 and then the command voltage and frequency are increased along a dotted line 97 in steps 126-137. Now, the stop condition of the motor is detected by such a fact that a motor current $I_{Mj}$ detected at step 106 is above a predetermined value.

In this embodiment, the initial command frequency $f_a$ is searched by decreasing the search frequency from the maximum value $f_{j(j=max)}$, however, the search frequency may be increased from the minimum value $f_{j(j=min)}$ for this purpose.

The embodiment was described for the case in which a power failure occurs at the time $t_1$, and frequency search is started at the time $t_2$ when the power supply recovers at that time. However, this method and apparatus can also be applied to the case in which the inverter is deactivated manually at the time $t_1$, leaving the motor to run by the inertia, and after that the free-running motor is restarted manually at the time $t_2$.

Figure 10:
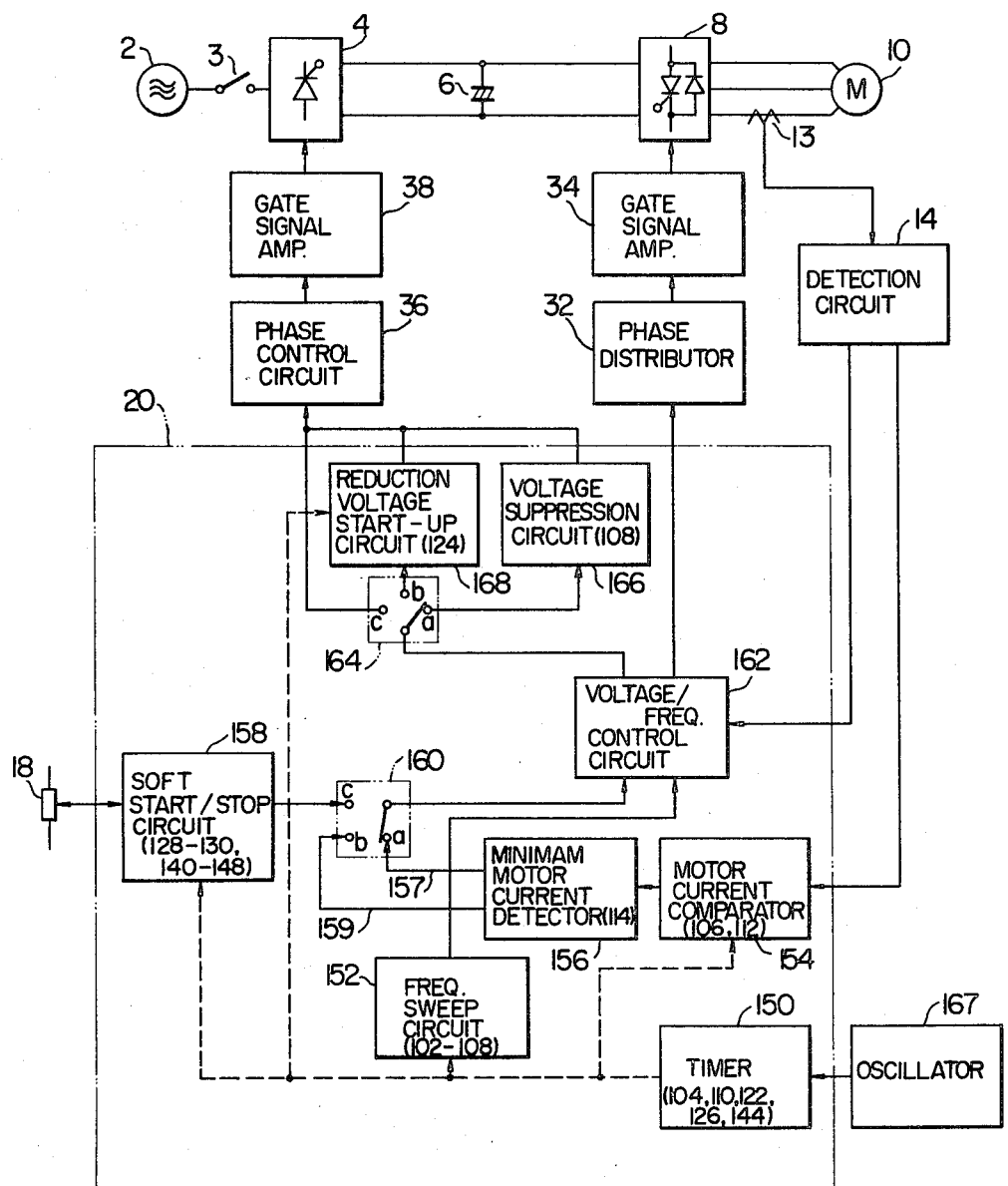
FIG. 10 is a block diagram explaining the functions of the CPU.

The functions of the microcomputer 20 in the foregoing second embodiment can be represented illustratively as blocks 150-168 in FIG. 10. The reference numerals in the blocks indicate the functions which the respective blocks perform in the flowchart of FIG. 7.

First, in starting the motor from zero speed, switches 160 and 164 are thrown to contacts c and a soft startstop circuit 158 operates under control of a timer 150 in accordance with the setup speed of the speed setup unit 18, so that the output voltage and frequency of a voltage/frequency control circuit 162 increase gradually. The voltage command signal and frequency command signal from the control circuit 162 are delivered to the phase distributor 32 and phase control circuit 36, respectively, and the motor is restarted.

Next, driving of the free-running motor will be explained. First, the switches 160 and 164 are thrown to contacts a, and a frequency sweep circuit 152 operates under control of the timer 150, so that the output voltage and frequency of the voltage/frequency control circuit 162 decrease gradually. Then, the control circuit 162 issues the frequency command signal and voltage command signal, indicating the reduction of the frequency and voltage along the line 40 in FIG. 2 (or line 96 in FIG. 6), to the phase distributor 32 and a voltage suppression circuit 166, respectively. The voltage suppression circuit 166 divides the analog voltage command signal by m, and delivers it to the phase control circuit 36. Then, frequency search is carried out along the line 98 in FIG. 6.

In this state, the motor current detected by the current detector 13 is read into a motor current comparator 154 sequentially through the detection circuit 14 so that the new current level is compared with the previous current level. A minimum current detecting circuit 156 determines whether the new current level is the minimum, and if it is not the minimum, a signal is issued on a line 157 so that the switches 160 and 164 are kept positioned on the contacts a. If the new current level is found minimum, a signal is issued on a line 159 so that the switches are turned to contacts b, and the control circuit 162 issues the frequency command signal corresponding to the minimum motor current and a reduction voltage start-up circuit 168 is operated to increase the command voltage gradually along the line 94 in FIG. 6. When the command voltage reaches the predetermined level, the switches 160 and 164 are turned to the contacts c, and the command voltage and command frequency are increased along the line 96 in FIG. 6 in accordance with the soft start-up circuit 158. When the command values reach the predetermined levels, control is transferred to the steady operation.

In the foregoing first and second embodiments, the frequency converter of a PAM system is used, however, the present invention can also be applied to the arrangement of a PWM system.

FIG. 11 is a block diagram of the third embodiment of the present invention, in which a frequency converter of a PWM system is employed. In this embodiment, a power rectifier 204 rectifies the output voltage of the AC power source to produce a constant DC voltage. The command voltage supplied to the motor is varied by controlling the pulse width of the output voltage from an inverter 208 in response to the output signal, i.e. the voltage command signal, from a PWM control circuit 236 given through a gate signal amplifier 234. The output frequency of the inverter is controlled in response to the output signal from the phase distributor 32, i.e. the frequency command signal, given through the gate signal amplifier 234. Other circuit arrangement is identical with that of FIG. 1. In FIG. 11, the same reference numerals are used for identical portions shown in FIG. 1. In the embodiment of FIG. 11, the free-running motor is restarted in the same way as in the case of FIG. 1, and it is carried out in accordance with the flowcharts of FIG. 4 and FIG. 7.

What is claimed is:

1. In a control apparatus for an induction motor wherein an alternating current power source is connected to the motor through a switch and a frequency converting means and the motor speed is controlled by controlling the output frequency and the output voltage of said frequency converting means, a method for controlling said induction motor which is running by the inertia in case of reenergizing said motor comprising:

a first step of causing said frequency converting means to produce at a time of starting of said motor an initial frequency which is expected to cause the absolute value of the current flowing in said free-running induction motor to become substantially minimum and an initial voltage which is insufficient to drive said motor;

a second step of increasing said output voltage gradually from said initial voltage with said initial frequency maintained; and a third step of increasing said output frequency and output voltage, with the ratio therebetween being maintained almost at a predetermined value, after said output voltage has reached a predetermined value, wherein said first step includes:

a fourth step of causing said output voltage to be used as a search voltage which is insufficient to drive said motor, and varying said output frequency and said search voltage with the ratio therebetween being maintained at a predetermined value;

a fifth step of detecting the motor current while said output frequency is varied for a variation of said output frequency by a pregiven value; and a sixth step of determining, as said initial frequency, an output frequency which corresponds to the minimum value of the motor current detected in said fifth step.

2. A method for controlling an induction motor according to claim 1, wherein said fourth step decreases said output frequency and said search voltage gradually with the ratio therebetween maintained at the predetermined value, and said sixth step compares the present motor current value corresponding to the present output frequency with the previous motor current value corresponding to the previous output frequency which is larger than the present frequency value by the pregiven value, and determine, as said initial frequency, a previous output frequency the previous motor current corresponding to which increases for the first time when compared with the present motor current corresponding to the present output frequency.

3. A method for controlling an induction motor according to claim 1, wherein said fourth step increases said output frequency and said search voltage gradually with the ratio therebetween maintained at the predetermined value, and said sixth step compares the present motor current value corresponding to the present output frequency with the previous motor current value corresponding to the previous output frequency which is less than the present frequency value by the pregiven value, and determine, as said initial frequency, a previous output frequency the previous motor current corresponding to which increases for the first time when compared with the present motor current corresponding to the present output frequency.

4. A method for controlling an induction motor according to claim 1, wherein a time period required for performing said second step is not shorter than a second time constant of said induction motor.

5. A method for controlling an induction motor according to claim 1, wherein said third step increases said output frequency and voltage until said output frequency and voltage reach pregiven frequency and voltage respectively, and thereafter maintains said output frequency and voltage at said pregiven frequency and voltage respectively.

6. A control apparatus for an induction motor, wherein an alternating current power source is connected to the motor through a switch and a frequency converting means and the motor speed is controlled by a controller through controlling the output frequency and the output voltage of said frequency converting means, said controller including:

first means for causing said frequency converting means to produce at a time of starting of said motor an initial frequency which is expected to cause the absolute value of the current flowing in said free-running induction motor to become substantially minimum and an initial voltage which is insufficient to drive said motor;

second means for increasing said output voltage gradually from said initial voltage with said initial frequency; and third means for increasing said output frequency and output voltage, with the ratio therebetween being maintianed almost at a predetermined value, after said output voltage has reached a predetermined value, wherein said first means includes:

fourth means for causing said output voltage to be used as a search voltage which is insufficient to drive said motor, and varying said output frequency and said search voltage with the ratio therebetween being maintained at a predetermined value;

fifth means for step of detecting the motor current while said output frequency is varied for a variation of said output frequency by a pregiven value; and sixth means for determining, as said initial frequency, an output frequency which corresponds to the minimum value of the motor current detected by said fifth means.

7. A method for restarting an AC motor which is running by inertia, in which upon restarting an a.c. voltage source is connected to the motor through a frequency converter and the motor speed is controlled by controlling the output frequency and the output voltage of said frequency converter and the motor rotates by the action of its moment of inertia, comprising:

a first step of causing said output voltage to be used as a search voltage which is insufficient to drive said motor, and varying said output frequency and said search voltage with the ratio therebetween being maintained at a predetermined value;

a second step of detecting a motor current while said output frequency is varied for a variation of said output frequency by a pregiven value;

a third step of determining, as an initial frequency, an output frequency which corresponds to the minimum value of the motor current detected in said second step;

a fourth step of increasing said output voltage gradually from an initial voltage which is insufficient to drive said motor with said initial frequency maintained; and a fifth step of increasing said output frequency and output voltage, with the ratio therebetween being maintained almost at a predetermined value, after said output voltage has reached a predetermined value.

8. A method for restarting an AC motor which is running by inertia, in which upon restarting an a.c. voltage source is connected to the motor through a frequency converter and the motor speed is controlled by controlling the output frequency and the output voltage of said frequency converter and the motor rotates by the action of its moment of inertia, comprising:

a first step of causing said output voltage to be used as a search voltage which is insufficient to drive said motor, and varying said output frequency and said search voltage with the relation therebetween being maintained at a predetermined relation;

a second step of detecting a motor current while said output frequency is varied for a variation of said output frequency;

a third step of determining, as an initial frequency, an output frequency which corresponds to the minimum value of the motor current detected in said second step;

a fourth step of increasing said output voltage gradually from an initial voltage which is insufficient to drive said motor; and a fifth step of varying said output frequency and output voltage, with the ratio therebetween being maintained almost at a predetermined value, after said output voltage has reached a predetermined value.

9. A method for restarting an AC motor according to claim 8, wherein said fifth step varies said output frequency and voltage until said output frequency and voltage reach a pregiven frequency and a pregiven voltage respectively, and thereafter maintains said output frequency and voltage at said pregiven frequency and pregiven voltage respectively.

10. A method for restarting an AC motor according to claim 8, wherein said first step decreases said output frequency and said search voltage gradually with the ratio therebetween maintained at a predetermined value; and said third step compares the present motor current value corresponding to the present output frequency with the previous motor current value corresponding to the previous output frequency which is larger than the present frequency value by a pregiven value, and determines, as said initial frequency, a previous output frequency at which the previous motor current increases for the first time when compared with the present motor current corresponding to the present output frequency.

11. A method for restarting an AC motor according to claim 8, wherein said fourth step first increases said output frequency and said search voltage gradually with the ratio therebetween maintained at the predetermined value; and said third step compares the present motor current value corresponding to the present output frequency with the previous motor current value corresponding to the previous output frequency which is less than the present frequency value by a pregiven value, a previous output frequency at which the previous motor current increases for the first time when compared with the present motor current corresponding to the present output frequency.

12. A control apparatus for an induction motor, wherein an alternating current power source is connected to the motor through a frequency converting means and the motor speed is controlled by a controller through controlling the output frequency and the output voltage of said frequency converting means, said controller comprising:

first means for causing said output voltage to be used as a search voltage which is insufficient to drive said motor, and varying said output frequency and said search voltage with the relation therebetween being maintained at a predetermined relation;

second means for detecting a motor current while said output frequency is varied for a variation of said output frequency;

third means for determining, as an initial frequency, an output frequency which corresponds to the minimum value of the motor current detected by said second means;

fourth means for increasing said output voltage gradually from an initial voltage which is insufficient to drive said motor; and fifth means for varying said output frequency and output voltage, with the ratio therebetween being maintained almost at a predetermined value, after said output voltage has reached a predetermined value.

* * * * *